(12) United States Patent
Janz et al.

(10) Patent No.: US 9,120,501 B2
(45) Date of Patent: Sep. 1, 2015

(54) DIVIDED STEERING GEAR HOUSING HAVING AN EXPOSED TOOTH RACK

(75) Inventors: Bernd Janz, Langenfeld (DE); Paul Hein, Solingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/447,449

(22) Filed: Apr. 16, 2012

(65) Prior Publication Data

US 2012/0240712 A1   Sep. 27, 2012

Related U.S. Application Data

(63) Continuation of application No. PCT/EP2010/065364, filed on Oct. 13, 2010.

(30) Foreign Application Priority Data

Oct. 15, 2009   (DE) .......................... 10 2009 049 633

(51) Int. Cl.
  *F16H 1/04*   (2006.01)
  *B62D 3/12*   (2006.01)

(52) U.S. Cl.
  CPC *B62D 3/12* (2013.01); *B62D 3/126* (2013.01); *Y10T 29/4984* (2015.01)

(58) Field of Classification Search
  CPC ........ B62D 3/12; B62D 74/1967; B62D 5/00; B62D 5/22
  USPC ............................ 74/89.11, 109, 388 PS, 422
  See application file for complete search history.

(56) References Cited

U.S. PATENT DOCUMENTS

| | | | | |
|---|---|---|---|---|
| 2,964,967 A * | 12/1960 | Osborne | .......................... | 74/498 |
| 3,753,375 A * | 8/1973 | Colletti | .......................... | 74/498 |
| 4,721,175 A * | 1/1988 | Butler | .......................... | 180/428 |
| 4,779,880 A * | 10/1988 | Hyodo | .......................... | 180/410 |
| 4,828,063 A * | 5/1989 | Ogura et al. | .................. | 180/400 |
| 6,408,976 B1 * | 6/2002 | Saito et al. | ..................... | 180/428 |
| 6,539,821 B2 * | 4/2003 | Bugosh | .......................... | 74/422 |
| 7,258,034 B2 * | 8/2007 | Kim | .......................... | 74/388 PS |
| 7,458,290 B2 * | 12/2008 | Jang | .......................... | 74/388 PS |
| 8,079,280 B2 * | 12/2011 | Kubota et al. | .................. | 74/422 |
| 2003/0074995 A1 * | 4/2003 | Little | .............................. | 74/422 |

(Continued)

FOREIGN PATENT DOCUMENTS

| | | |
|---|---|---|
| DE | 10024213 A1 | 9/2004 |
| WO | 2011045350 A1 | 4/2011 |

OTHER PUBLICATIONS

International Search Report for PCT/EP2010/065364 issued Dec. 22, 2010; 4 pages.

*Primary Examiner* — William Kelleher
*Assistant Examiner* — Zakaria Elahmadi
(74) *Attorney, Agent, or Firm* — Additon, Higgins & Pendleton, P.A.

(57) ABSTRACT

A rack-and-pinion steering system and a method for producing the same including a pinion, a toothed rack, and a bearing point for the toothed rack, wherein the toothed rack includes a toothed first part and a non-toothed second part, wherein at least the first part and the pinion form a steering gear, and the steering gear is enclosed by a steering gear housing, and wherein the bearing point is enclosed by a bearing housing ensuring permanent lubrication. The second part of the toothed rack is exposed in at least one section between the steering gear housing and the bearing housing.

10 Claims, 2 Drawing Sheets

(56) References Cited

U.S. PATENT DOCUMENTS

| | | |
|---|---|---|
| 2006/0090581 A1 | 5/2006 | Jang |
| 2008/0034911 A1* | 2/2008 | Bieber et al. .................... 74/422 |
| 2008/0184833 A1* | 8/2008 | Dohmann ....................... 74/422 |

* cited by examiner

DIVIDED STEERING GEAR HOUSING HAVING AN EXPOSED TOOTH RACK

This nonprovisional application is a continuation of International Application No. PCT/EP2010/065364, which was filed on Oct. 13, 2010, and which claims priority to German Patent Application No. DE 10 2009 049 633.5, which was filed in Germany on Oct. 15, 2009, and which are all herein incorporated by reference.

BACKGROUND OF THE INVENTION

The invention relates to a rack-and-pinion steering system, at least comprising a drive element, a toothed rack and a bearing point for the toothed rack. Moreover, the invention relates to a method for producing a rack-and-pinion steering system, as well as to a use of a rack-and-pinion steering system.

Rack-and-pinion steering systems are already known from the state of the art. For example, DE 100 24 213 A1 describes the structure of a manual steering gear. This comprises a steering housing, a toothed rack disposed therein as well as a pinion connected to the steering column. The gear housing comprises two housing elements for the drive gear and the toothed rack. The housing elements are interconnected by a light-weight tube.

The drawbacks of the rack-and-pinion steering systems known from the prior art are their great weight and the high production expenditure.

BRIEF SUMMARY OF THE INVENTION

It is the object of the invention to provide an improved rack-and-pinion steering system. In particular, a rack-and-pinion steering system is to be provided which has a lower weight. Moreover, it is the object of the invention to propose a method for producing a rack-and-pinion steering system, as well as a possibility for the use thereof.

According to the invention, the object is achieved by a rack-and-pinion steering system according to claim 1, a method according to claim 7 as well as a use of a rack-and-pinion steering system. Other advantageous embodiments become apparent from the following description and the dependent claims.

A rack-and-pinion steering system is proposed which at least comprises a drive element, a toothed rack and a bearing point for the toothed rack, wherein the toothed rack comprises a toothed first part and a second part, at least the first part and the drive element forming a steering gear, and the steering gear being surrounded by a steering gear housing, and the bearing point being surrounded by a bearing housing, wherein the second part of the toothed rack is exposed in at least one section between the steering gear housing and the bearing housing.

The individual features of the embodiments described are not limited thereto but may be combined with one another and with features to constitute other embodiments.

An exposed section within the sense of the invention is to be understood to be a section of the toothed rack, or of the second part of the toothed rack, which is not surrounded by a housing or any other component of the rack-and-pinion steering system. The exposed section can vary depending on the steering angle, i.e. the exposed section can be a different area of the second part. For example, given a steering angle of the rack-and-pinion steering system oriented towards the left, a different area of the second part forms the exposed section than is the case given a steering angle oriented towards the right. Components that surround the rack-and-pinion steering system, such as the body of a vehicle in which the rack-and-pinion steering system is installed, can be provided. The second part can be configured with or without teeth. Moreover, the second part can have any cross-sectional geometry.

An important advantage of the proposed rack-and-pinion steering system consists in materials saving which leads to a weight reduction of the rack-and-pinion steering system. As great as possible a weight saving is thus realized as compared with the currently common steering gear designs. Accordingly, the production expenditure for producing the rack-and-pinion steering system is also lower than know systems.

In the case of the proposed rack-and-pinion steering system, the housing of a steering gear known from the prior art is divided into two functional sub-assemblies. The first sub-assembly consists of the actual gear which has the function of converting a rotational movement into a translational movement. This gear is preferably located, protected against environmental influences, in the steering gear housing from which the translationally and/or rotationally moved parts are lead out, preferably sealed. In one embodiment, it is provided that a hydraulic or electric steering power assistance system is disposed in the steering gear housing.

A second sub-assembly consists of a bearing housing in which a thrust bearing, for example, is located, which may be configured to be pivotable. In one embodiment, for example, a spherically mounted slide bearing is provided. In this slide bearing, the toothed rack is guided movably both axially and radially. The slide bearing preferably introduces lateral forces, which are introduced through the track rod into the toothed rack, through the housing into the bolting surfaces. Preferably, all occurring longitudinal forces, also referred to as toothed-rack forces, are transmitted through the bolting surfaces of the housing containing the gearing. Another advantageous embodiment provides a gimbal mount.

Among other things, the bearing housing can serve for maintaining a permanent lubrication. A permanent lubrication is understood to be, for example, a grease lubrication, such as, for example MoS2 lubricating grease. The grease is enclosed by the bearing housing, so that the grease has to be replaced or topped up only if parts of the bearing housing or the bearing are replaced.

The drive element and a toothing of the toothed part of the toothed rack may have any shape. In a preferred embodiment, the drive element comprises a pinion. In particular, toothed racks with a constant and variable transmission in various embodiments are provided. The variable transmission is realized by a change of the toothing geometry over the stroke of the toothed rack. A progressive transmission of the steering gear is particularly preferred.

In another embodiment, it is provided that the toothed rack, at least in the second part, comprises an anti-corrosion agent. Preferably, at least a section of the second part is protected against corrosion, which is defined by the union set of the free sections of the maximum steering angles towards the left and the right. In another embodiment, it is provided that the toothed rack also has a protection against corrosion also in the first part.

Anti-corrosion agents within the sense of the invention are understood to be, for example, oils, waxes, lacquers, chemicals or coatings consisting of, for example, plastics, metals or metal oxides, which prevent or delay corrosion over the life of the toothed rack.

Corrosion is understood to be a reaction of a metallic material with its environment which causes a measurable change of the material and can lead to an adverse effect on the function of a metallic component or of an entire system. In most cases, the reaction is of an electrochemical nature; in some cases, it can be of a chemical or metal-physical nature. In particular, reference is made, within the context of this disclosure, to DIN EN 8044 in its entirety.

In another embodiment, it is provided that the toothed rack, at least in the second part, comprises a non-corroding material. A non-corroding material can be a non-metallic material, for example. In another embodiment, a highly alloyed steel, so-called stainless steel, is provided. A non-corroding material preferably is a material which does not exhibit any corrosion phenomena over the life of the toothed rack or of the vehicle in which the toothed rack is installed, which lead to a failure of the rack-and-pinion steering system, given a use of the toothed rack in an environment that is typical for a respective vehicle.

In another embodiment, it is provided that the steering gear housing, at exit points of the toothed rack, is respectively sealed by a bellows. In one embodiment, the bellows has a material which at least comprises rubber or a plastic. Preferably, the bellows serves for sealing the steering gear housing at the exit point of the toothed rack, preferably for avoiding an escape of grease from the steering gear housing.

In one embodiment, only the toothed rack connects the steering gear housing with the bearing housing. It can be provided that the rack-and-pinion steering system, apart from the toothed rack, has no component that connects the steering gear housing with the bearing housing. In another embodiment, it is provided that lines are provided between the steering gear housing and the bearing housing that connect them. In another embodiment, it is provided that stabilizing means are provided between the steering gear housing and the bearing housing. Preferably, the stabilizing means can be removed from the rack-and-pinion steering system after the rack-and-pinion steering system has been installed in a vehicle.

The present invention further relates to a method for producing a rack-and-pinion steering system, the method comprising the following steps: providing a drive element, a toothed rack as well as a bearing point for the toothed rack, providing a steering gear housing and a bearing housing, installing the bearing point into the bearing housing, installing at least the drive element and at least one toothed first part of the toothed rack into the steering gear housing, so that at least one section of a second part of the toothed rack is exposed between the steering gear housing and the bearing housing.

In particular, the method is suitable for producing the rack-and-pinion steering system with the preferred features which was already described in detail above.

Another idea of the invention is the use of a rack-and-pinion steering system as described above in a vehicle, preferably in a passenger car.

Other advantageous embodiments become apparent from the following drawings. However, the Figures depicted therein are not to be construed as limiting; rather, the features described therein can be combined with one another and with the above-described featured to form further embodiments. Parts that are the same or that have the same function have the same reference numerals below.

DETAILED DESCRIPTION OF THE INVENTION

Figure 1:
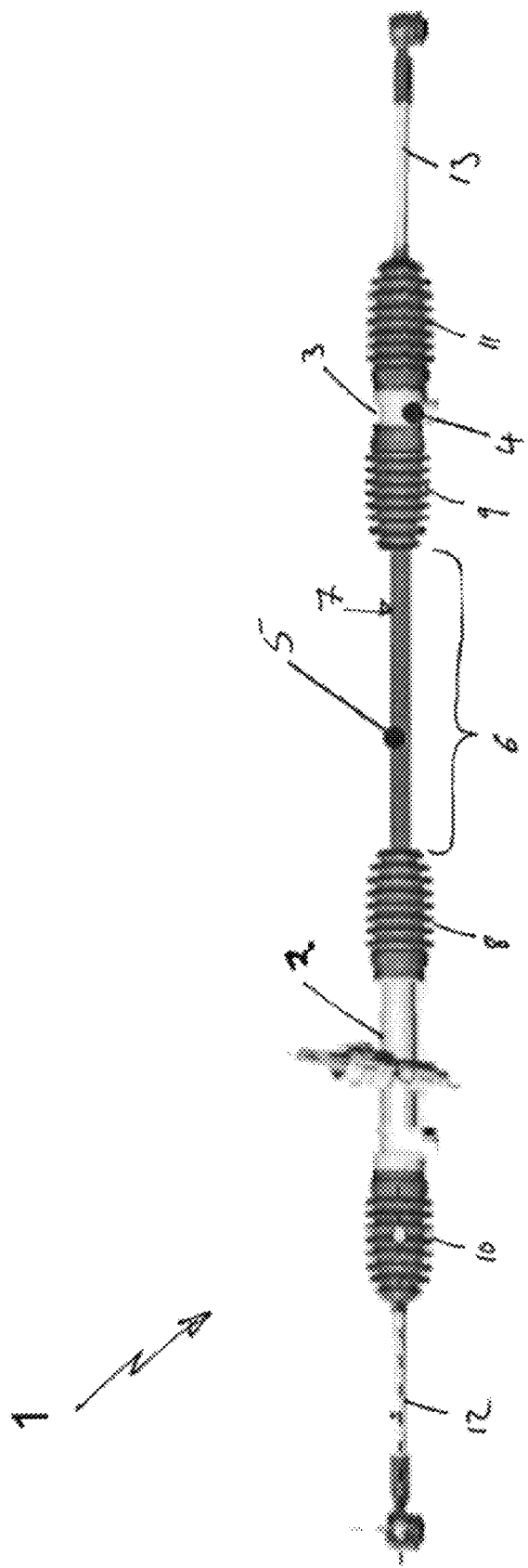
FIG. 1 shows a side elevation view of a rack-and-pinion steering system according to the invention.

Briefly, FIG. 1 shows a rack-and-pinion steering system 1 comprising a steering gear housing 2 and a bearing housing 3 for a bearing point 4 concealed in this case by the bearing housing 3. A toothed rack 5 extends at least from the steering gear housing 2 to the bearing housing 3, with a section 6 of the toothed rack 5 being exposed. The toothed rack 5, at least in section 6, has an anti-corrosion agent applied to a surface 7 of the toothed rack 5. Bellows 8, 9 seal the steering gear housing 2 and the bearing housing 3 towards the toothed rack 5. Moreover, bellows 10, 11 seal the bearing housing 3 and the steering gear housing 2 towards the steering rods 12, 13.

Figure 2:
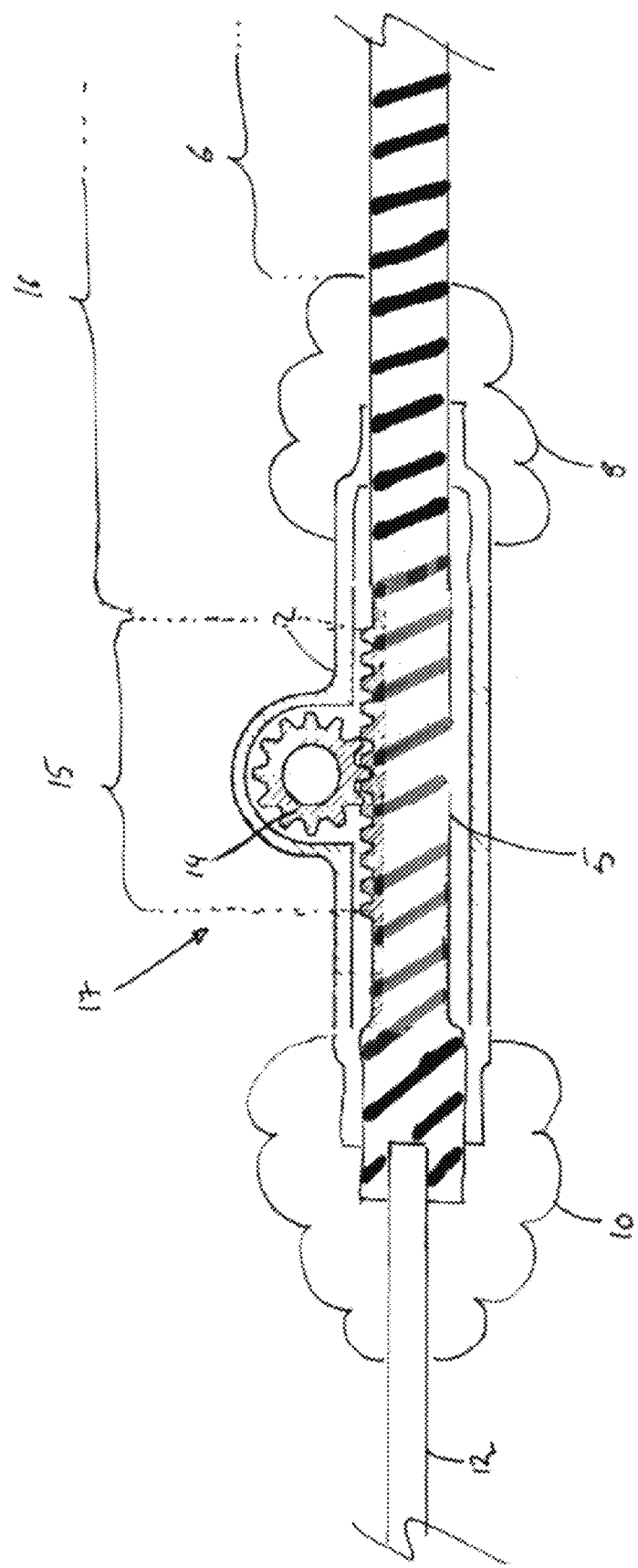
FIG. 2 shows a cross-sectional view of the steering gear housing according to the invention.

Further, FIG. 2 shows a schematic cross-sectional view through a steering gear housing 2. The steering gear housing 2 is sealed by a bellows 8 towards the exposed section 6 of the toothed rack 5 and by a bellows 10 towards the steering rod 12. At least one drive element 14 configured as a pinion and the toothed first part 15 of the toothed rack 5, which together form a steering gear 17, are located in the steering gear housing 2. The second part 16 without teeth, at least in some operational positions or at certain steering angles, protrudes into the steering gear housing 2.

The rack-and-pinion steering system (1) comprises a drive element (14), a toothed rack (5) and a bearing point (4) for the toothed rack (5), wherein the toothed rack (5) comprises a toothed first part (15) and a second part (16). At least the first part (15) and the drive element (14) form a steering gear (17). The steering gear (17) is surrounded by a steering gear housing (2), and the bearing point (4) is surrounded by a bearing housing (3). The second part (16) of the toothed rack (5) is exposed in at least one section (6) between the steering gear housing (2) and the bearing housing (3).

In one embodiment, the toothed rack (5), at least in the second part (16), incorporates an anti-corrosion agent. In another embodiment, the toothed rack (5), at least in the second part (16), comprises a non-corroding material.

The steering gear housing (2), at exit points of the toothed rack (5), may be respectively sealed by bellows (8) (10).

In another embodiment, only the toothed rack (5) connects the steering gear housing (2) with the bearing housing (3).

It will be understood that the bearing point (4) may be comprised of a spherical slide bearing.

The invention also encompasses a method for producing a rack-and-pinion steering system (1) that comprises the following steps:

providing a drive element (14), a toothed rack (5) and a bearing point (4) for the toothed rack (5), providing a steering gear housing (2) and a bearing housing (2), installing the bearing point (4) into the bearing housing (3), installing at least the drive element (14) and at least one toothed first part (15) of the toothed rack (5) into the steering gear housing, such that at least one section of a second part of the toothed rack is exposed between the steering gear housing and the bearing housing.

In one embodiment of the method at least one area of the second part (15) of the toothed rack (5) is protected against corrosion. Moreover, in another embodiment, the toothed rack (5), at least in the second part (16), is produced from a non-corroding material.

The steering gear housing (2) used in the method may be sealed by a bellows (8) at an exit point of the toothed rack (5).

In one embodiment, only the toothed rack (5) of the rack-and-pinion steering system (1) incorporated into the method connects the steering gear housing (2) with the bearing housing (3). The bearing point (4) used in the method may be formed by a spherical slide bearing.

The invention claimed is:

1. Rack-and-pinion steering system (1), comprising a drive element (14), an integral toothed rack (5) and a bearing point (4) for the toothed rack (5), wherein the toothed rack (5) comprises a toothed first part (15) and a second part (16), at least the first part (15) and the drive element (14) forming a steering gear, and the steering gear (17) being surrounded by a steering gear housing (2), and the bearing point (4) being surrounded by a bearing housing (3) that is sealed by at least one bellow (9, 11),
  wherein the second part (16) of the toothed rack (5) is exposed in at least one section (6) between the steering gear housing (2) and the bearing housing (3),
  wherein the rack-and-pinion steering system (1) comprises exactly one spherical slide bearing, the spherical slide bearing positioned at the bearing point (4), and
  wherein the portion of the toothed rack (5) that does not bear teeth defines a consistent diameter from the drive element (14) to the bearing point (4), thereby avoiding any change in diameter of that portion of the toothed rack that does not bear teeth and providing consistent resistance to forces acting against the rack from all directions,
  wherein the system facilitates mechanical and manufacturing efficiencies by eliminating the requirement for a link between the steering gear housing (2) and the bearing housing (3) by relying upon the integral toothed rack.

2. Rack-and-pinion steering system (1) according to claim 1, wherein the toothed rack (5), at least in the second part (16), comprises an anti-corrosion agent.

3. Rack-and-pinion steering system (1) according to claim 1, wherein the toothed rack (5), at least in the second part (16), comprises a non-corroding material.

4. Rack-and-pinion steering system (1) according to claim 1 wherein the steering gear housing (2), at exit points of the toothed rack (5), is respectively sealed by a bellows (8)(10).

5. Rack-and-pinion steering system (1) according to claim 1 wherein the toothed rack (5) connects the steering gear housing (2) with the bearing housing (3).

6. Method for producing a rack-and-pinion steering system (1), wherein the method comprises the following steps:
  providing a drive element (14), an integral toothed rack (5) and a bearing point (4) for the toothed rack (5),
  providing a steering gear housing (2) and a bearing housing (3) wherein the bearing housing is sealed by at least one bellow (9, 11),
  installing the bearing point (4) into the bearing housing (3),
  installing at least the drive element (14) and at least one toothed first part (15) of the toothed rack (5) into the steering gear housing, so that at least one section of a second part of the toothed rack is exposed between the steering gear housing and the bearing housing, and
  wherein the rack-and-pinion steering system (1) comprises exactly one spherical slide bearing, the spherical slide bearing positioned at the bearing point (4),
  wherein the portion of the toothed rack (5) that does not bear teeth defines a consistent diameter from the drive element (14) to the bearing point (4), thereby avoiding any change in diameter of that portion of the toothed rack that does not bear teeth and providing consistent resistance to forces acting against the rack from all directions.

7. Method according to claim 6, wherein at least one area of the second part (15) of the toothed rack (5) is protected against corrosion.

8. Method according to claim 6 wherein the toothed rack (5), at least in the second part (16), is produced from a non-corroding material.

9. Method according to claim 6 wherein the steering gear housing (2), at an exit point of the toothed rack (5), is sealed by a bellows (8/10).

10. Method according to claim 6 wherein only the toothed rack (5) of the rack-and-pinion steering system (1) connects the steering gear housing (2) with the bearing housing (3).

* * * * *